Aug. 11, 1942.   W. LENNOX   2,292,763
FRICTION ACTUATED TURNTABLE
Filed April 2, 1941   5 Sheets-Sheet 2

Inventor
WILSON LENNOX
By Clarence A. O'Brien
Attorney

Inventor
WILSON LENNOX
By Clarence A. O'Brien
Attorney

Inventor
WILSON LENNOX

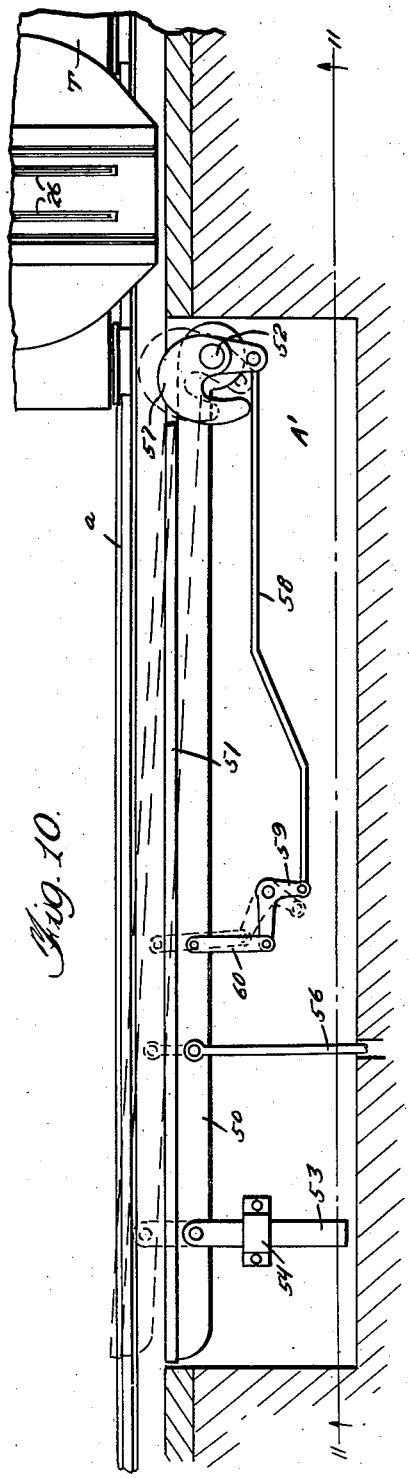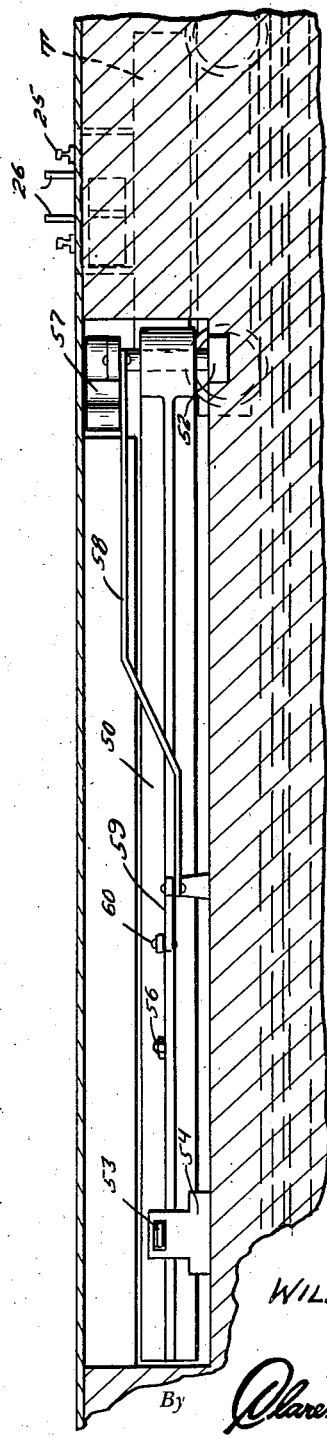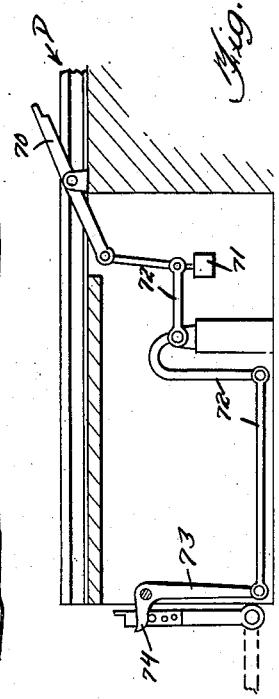

Patented Aug. 11, 1942

2,292,763

UNITED STATES PATENT OFFICE 2,292,763

FRICTION ACTUATED TURNTABLE

Wilson Lennox, Summit Hill, Pa.

Application April 2, 1941, Serial No. 386,525

1 Claim. (Cl. 104—48)

This invention relates to a friction actuated turntable which is mainly designed for use on transfer trucks which transfer cars from an "empty" track to a track leading to a shaft, the general object of the invention being to provide a turntable for turning the cars as they are moved by the transfer trucks to have the cars facing in the desired direction as they are delivered to the shaft track.

Another object of the invention is to provide an annular friction surface on the turntable and to provide a friction bar manually operated into position to engage the friction surface as the transfer truck moves along its track so that the turntable will be turned by the friction means to properly position the car on the turntable as the truck travels toward the shaft track.

Another object of the invention is to provide locking means for holding the turntable with its track in alignment with the stationary track when the transfer truck is in car receiving or car delivering position, with means for releasing the locking means when the friction bar is moved to operative position.

Another object of the invention is to provide means for holding a car on the turntable against movement until such means are released by manually operated means at a shaft track.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 10 is a top plan view with parts in section showing the friction bar and a portion of the truck and track and the parts associated with the bar.

Figure 11 is a sectional view approximately on the line 11—11 of Figure 10.

Figure 12 is a section on approximately the line 12—12 of Figure 1.

Figure 13 is a section on the line 13—13 of Figure 1.

In these drawings the letter A indicates the pit which contains the rails $a$ for the wheels of the transfer truck T, this truck being used for transferring mine cars from the track B for the empty cars to the tracks C and D which lead the cars to elevators in the mine shafts S.

Figure 1:
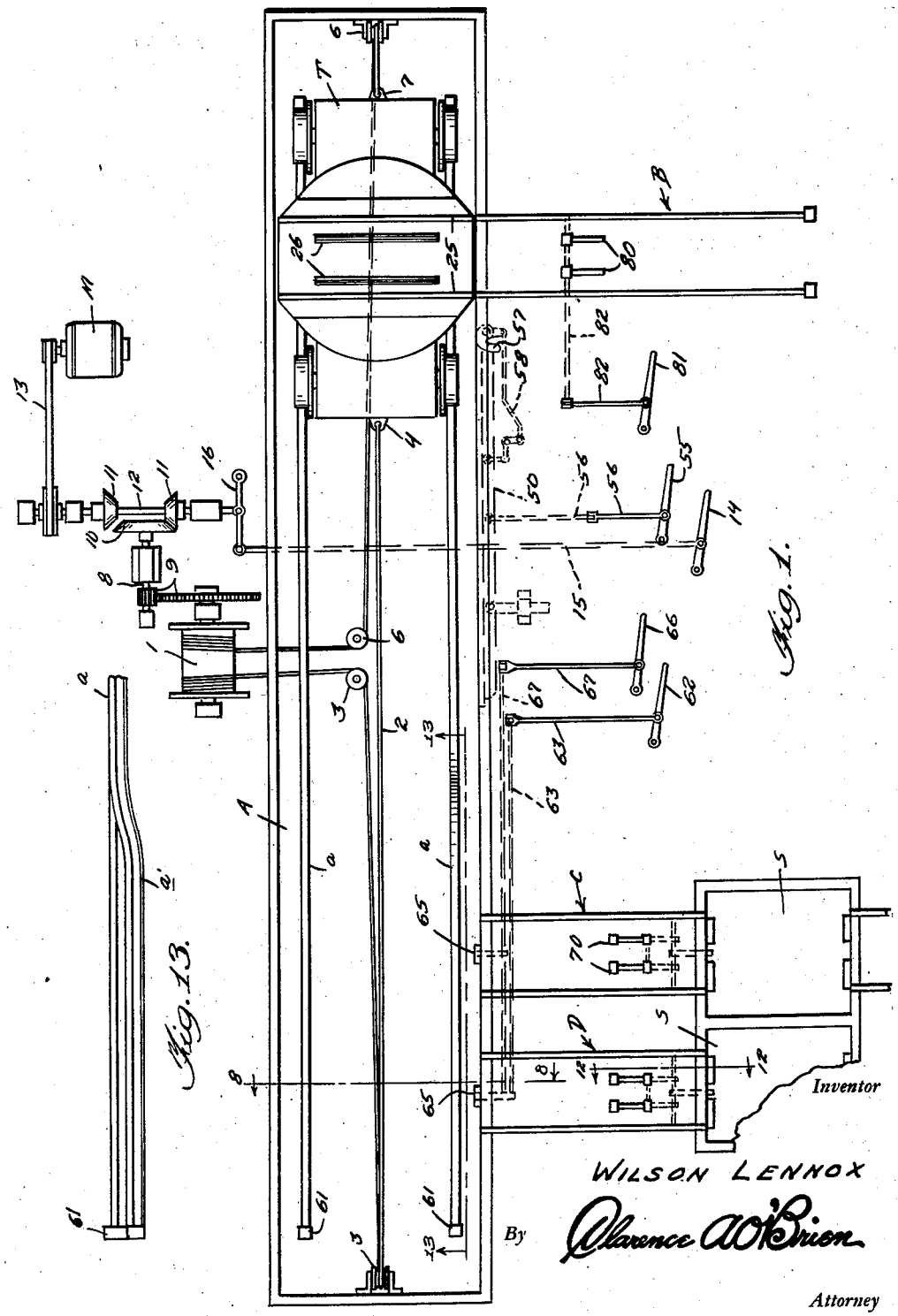
Figure 1 is a plan view, largely diagrammatic showing the invention in use for transferring cars from an empty track to either one of a pair of tracks leading to mine shafts.
Figure 2:
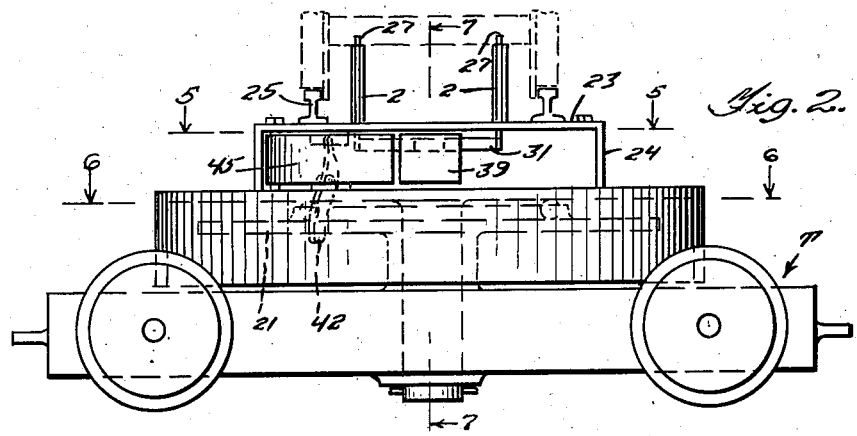
Figure 2 is an elevational view of the transfer truck constructed in accordance with this invention.

A drum 1 is rotatably supported adjacent the pit and has a cable 2 attached thereto which passes over the guiding pulleys 3 and is connected to the front of the truck as shown at 4. Another cable 5 is wound in an opposite direction on the drum and passes over the pulleys 6 and is connected to the rear end of the truck as shown at 7. Thus by winding the drum in one direction the truck will be moved from the position shown in Figure 1 to the opposite end of the track formed by the rails $a$ and then by turning the drum in an opposite direction the truck will be returned to the position it occupies in Figure 1. A shaft 8 is suitably supported for rotary motion and is connected by the gears 9 to the shaft of the drum and said shaft 8 has a friction wheel 10 thereon adapted to be engaged by either one of the beveled friction wheels 11 on a shaft 12 driven from a motor M by the driving connection 13. The wheels 11 are moved into and out of engagement with the wheel 10 by a hand lever 14 connected by a link 15 with a lever 16 suitably connected with the shaft 12 in such a manner as not to interfere with the rotary movement of the shaft. Thus by manipulating the hand lever 14 either one of the wheels 11 can be placed in engagement with the wheel 10 so that the drum 1 can be driven in either direction as the operator desires.

The rear portion of that rail $a$ which is adjacent the shaft tracks is dropped below the level of the other rail as shown at $a'$ in Figure 13. Thus when the truck reaches this part of its track it will tilt toward the tracks C and D so that a car on the turntable of the truck will automatically run off of the turntable upon one of the tracks C and D as will be hereinafter described.

Figure 3:
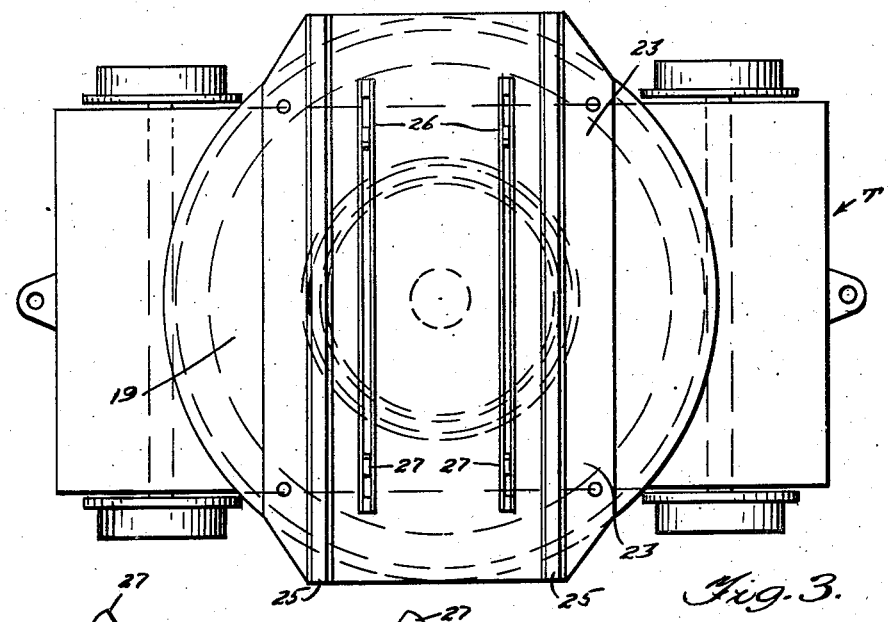
Figure 3 is a top plan view of Figure 2.
Figure 4:
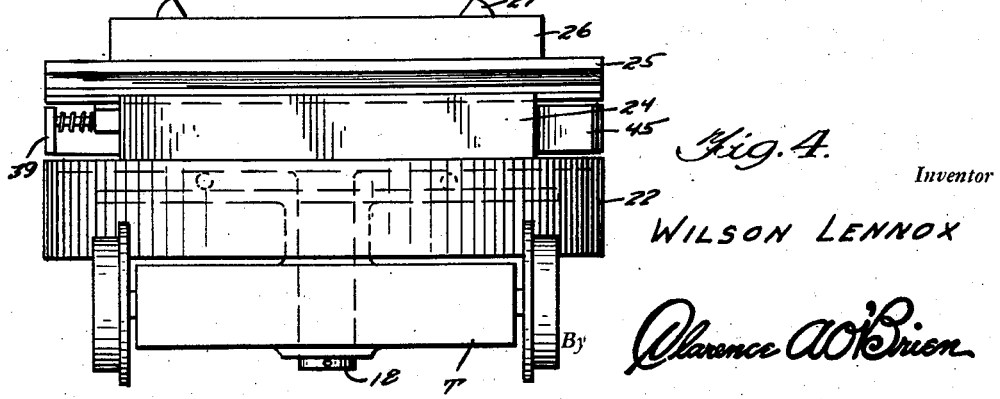
Figure 4 is an end view of the transfer truck.
Figure 7:
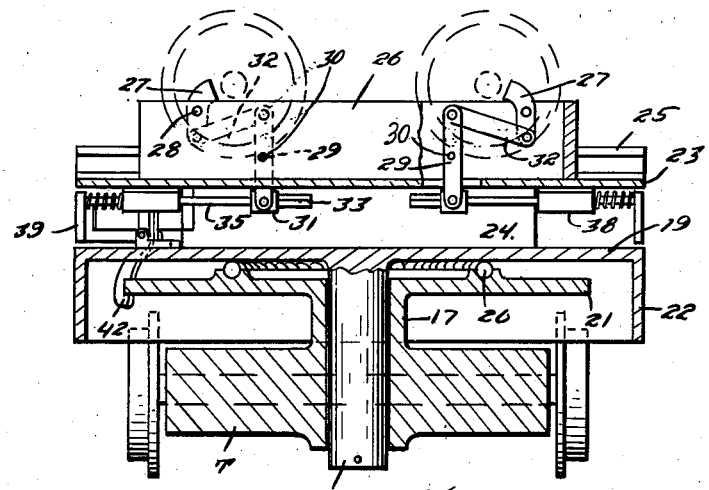
Figure 7 is section on the line 7—7 of Figure 2.

As more clearly shown in Figure 7 the central part of the truck has an upstanding boss 17 thereon and a vertically arranged opening passing through the boss and through the said central part of the truck for receiving a circular shank 18 on a turntable 19. Anti-friction means 20 are placed between the underside of the turntable and a circular platform 21 connected with the top of the boss 17. The turntable 19 is provided with a depending annular flange 22 the outer circumference of which forms a friction surface. A track carrying platform 23 is supported in spaced relation from the table 19 by the vertical members 24, these parts 23 and 24 forming a housing on the table which is closed at its sides but open at its ends as shown more clearly in Figure 5. The member 23 has the track forming rails 25 thereon and also the channel-shaped guides 26 which parallel the rails and are spaced inwardly therefrom as shown in Figure 3. Of course, the rails 25 are to receive the wheels of a mine car X shown in dotted lines in Figure 8 and said car is held on the rails 25 by means of the two pairs of holding dogs 27 which are adapted to engage the axles of a mine car. These dogs are pivoted in the guides 26 as shown at 28 and bars 29 are pivoted in the upper portions of the guides as shown at 30 and extend downwardly through slots in the bottom of the guides where the bars 29 for each pair of dogs are connected together by a weight 31, each weight being located below the member 23 in the housing formed by such member 23 and the side members 24 and connecting the bars 29 in the two guides 26. A link 32 connects each bar 29 above its pivotal point to the lower end of a dog and the parts are so formed and arranged that the weight 31 acts to hold the two dogs in upright position engaging or adjacent to an axle of a mine car as shown in Figure 7.

Each weight 31 is adapted to be moved in a direction to lower the dogs 27 to permit the mine care to pass from the rails 25 through means of a pair of curved arms 33 pivoted to the lower face of the member 23 intermediate the ends of the arms as shown at 34. A rod 35 has a pin 36 at its inner end passing through slots 37 formed in the overlapping inner ends of the arms 33 and said rod passes through a guide 38 depending from the member 23 and has a head 39 attached to its outer end. A coil spring 40 is placed on the rod and is located between the guide 38 and the head 39 and tends to hold the rod in an outward position with the arms 33 in the position shown in Figure 5 at the top thereof so that the weight 31 is held in a position with the dogs 27 in holding position. However, a push upon the head 39 will cause the rod 35 to move the arms 33 to the dotted line position shown at the bottom of Figure 5 and thus the arms exert pressure upon the weight 31 and move the same so as to swing the dogs 27 downwardly and outwardly so that the mine car can pass from the turntable.

Figure 5:
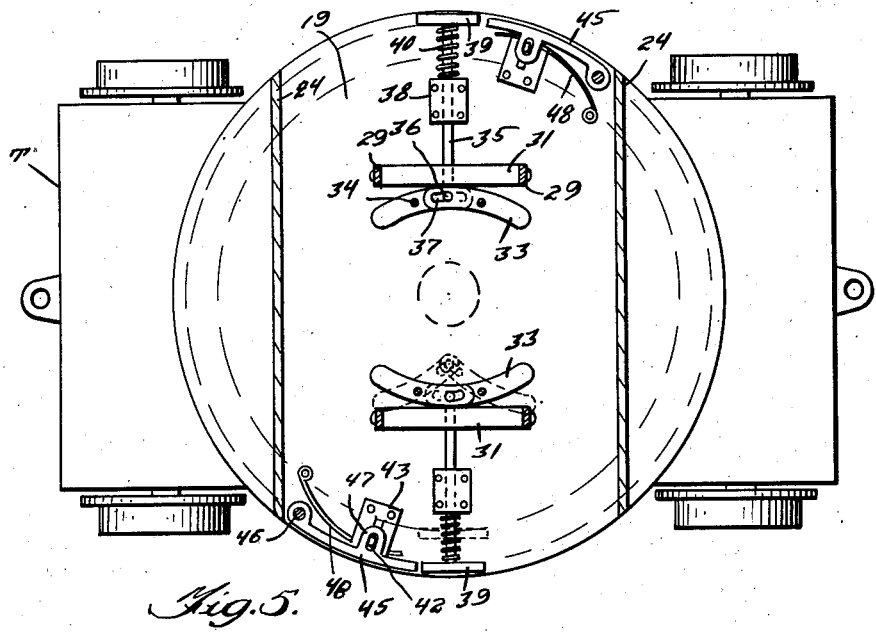
Figure 5 is a section on the line 5—5 of Figure 2.
Figure 6:
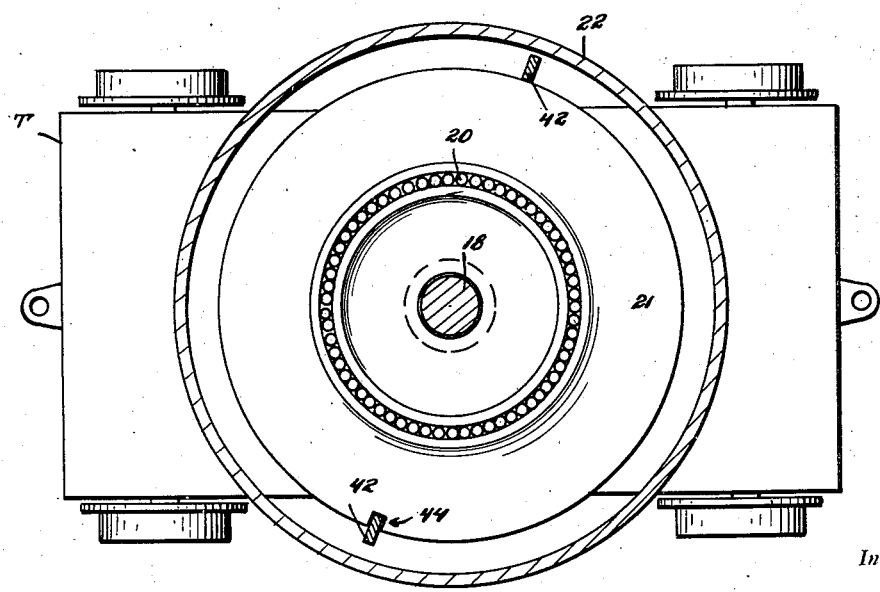
Figure 6 is a section on the line 6—6 of Figure 2.

Locking means are also provided for locking the turntable in either one of two positions so that the turntable is locked against movement after the table has made one-half of a revolution. Such means include a pair of vertically arranged latch members 42 pivoted at their upper ends to the plates 43 attached to the table 19 with the latch members diametrically arranged and passing through slots in the table for engagement with the keeper notch 44 formed in the periphery of the member 21. An arcuate member 45 is provided for each latch member and this member 45 is pivoted to the table 19 as shown at 46 and it has a slotted lug 47 extending inwardly therefrom, the slot of which receives the upper end of the latch member 42 as shown more particularly in Figure 5. A spring 48 is fastened to the table 19 and engages the inner face of the member 45 for pressing the same outwardly and thus this member 45 will hold the latch member 42 in position to engage the notch 44 when the latch member comes opposite the notch. As shown in Figure 5 this member 45 and the head 39 of the rod 35 are arranged adjacent the periphery of the table 19 and in the space formed by the members 24 and 23.

As will be seen, member 45 engages member 42 above the pivot of the latter so that when member 45 moves outwardly, member 42 moves inwardly to locking position.

A friction bar 50 is movably arranged in an extension A' of the pit A at one side of the pit and its operating face is formed with a lining 51 of leather or the like. This bar is pivoted at its forward end to a vertically arranged shaft 52, see Figures 10 and 11, and a guide bar 53 is pivoted to its rear end and passes through a guide 54, these parts 53 and 54 guiding the bar in its movement. This bar is operated from a hand lever 55 through means of the linkage 56 and when it is moved inwardly it will contact the annular friction flange 22 of the turntable so that the turntable will be turned as the truck travels past the bar. A substantially hook-shaped member 57 is pivoted to the shaft 52 and a link 58 connects the hook with a bell-crank 59 pivoted in the pit and connected to the bar 50 by a link 60. Thus as the bar 50 is moved outwardly to engage the flange of the turntable the hook 57 is projected, as shown in Figure 10, so that it will engage an arcuate member 45 to push the arcuate member inwardly, thus releasing a latch member 42 from the notch 44 to release the turntable. This is done before the turntable reaches the projected part of the bar 50 so that as the truck moves along the flange 22 of the turntable will engage the lining of the bar 50, after the locking means of the turntable have been released, and thus the turntable will be given a half revolution for as soon as the second latch member 42 comes opposite the notch 44 in the member 21 said latch member will enter the notch and thus the turntable will be locked against further movement. In this manner the turntable is given a half revolution which, of course, turns the car on the track rails 25 a half revolution to place the proper end of the mine car facing the side of the apparatus having the tracks leading therefrom. The truck proceeds toward the left in Figure 1 and it is tilted as the wheels at one side thereof engage the low part a' of the track a.

Figure 8:
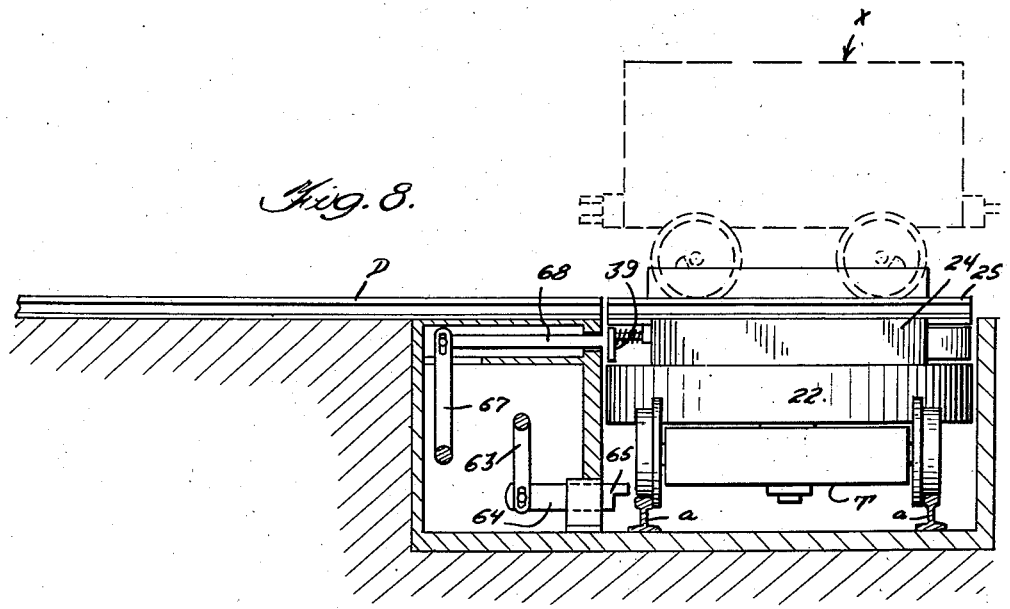
Figure 8 is section on the line 8—8 of Figure 1.
Figure 9:
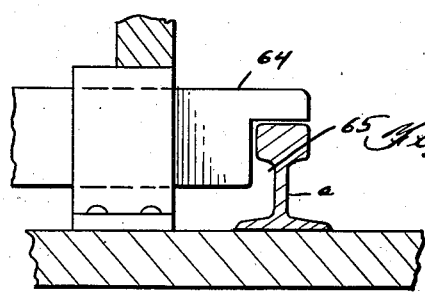
Figure 9 is a sectional detail view showing the truck holding means in holding position.

If the car is to be delivered to the mine track D the truck will proceed to the end of the track where it is stopped by the stop members 61 at the ends of the track a. However, if the car is to be delivered to the track C then the operator manipulates the lever 62 which through means of the connections 63 will move a sliding stop member 64 from the position shown in Figure 8 to the position shown in Figure 9 wherein the notch 65 in the outer end of the member 64 will receive a part of the rail a and thus this member 64 will act as an abutment to engage a wheel of the truck T to stop the same in position with the rails 25 on the turntable in alignment with the rails of the track C. Of course, if the turntable is to deliver the car to the track D then the member 64 is retracted, as shown in Figure 8 so that the truck can proceed to the end of the track where the rails of the turntable will be in alignment with the rails of the track D.

Of course, when the track is in position with the mine car ready to be delivered to either the track C or the track D the car would pass from the track on the turntable to a mine track but is prevented from doing so by the dogs 27. When the truck is in position with its rails 25 in alignment with the rails of either the track C or D then the operator manipulates a lever 66 which through the connection 67 forces outwardly plungers 68 at the inner end of the tracks C and D so that one of these plungers will strike the head 39 of a rod 35 so as to cause the rod to move the arms 33 to a position to cause the weights 31 to move the parts 29 and 32 to cause the dogs 27 to swing outwardly and downwardly and thus release the mine car so that the same can run off the track 25 of the turntable, due to the inclination of the track by the truck engaging the low part $a'$ and thus the mine car will run upon the tracks C to D according to which track the rails 25 are opposite. The mine car is stopped on the track C or D by the stop levers 70, see Figure 12, these levers being normally held in operative position by the weights 71 but the levers are moved to inoperative position through means of the connection 72 to an L-shaped lever 73, the short arm 74 of which is adapted to be engaged by the mine cage, when the cage is in position to receive the car from a track C or D. Thus there is no danger of a car passing from a track C or D into a mine shaft until the cage is in position ready to receive the car.

Thus it will be seen that the mine car is reversed from one end to the other on the transfer truck and as the truck travels from the track B to the track C or D, with means for locking the turntable in position with its rails 25 aligning with the rails of the stationary tracks. Also it will be seen that the turntable is turned by friction of the manually projected friction bar with the flange 22 of the table so that no cogs or similar means are used, with lock means for holding the turntable in either one of its two positions.

Stop members 80 for the empty cars on track B are operated from a hand lever 81 and the connection shown at 82.

If it is not necessary to turn a car on the track then the bar 50 is not moved and thus the turntable will not be actuated.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In apparatus of the class described, a car transporting truck adapted to travel along a track, means to propel said truck in opposite directions, respectively, a rotary turntable on said truck for carrying cars and turning the same end for end, means to rotate said turntable during travel of said truck in one direction comprising an annular friction member on said table, a bar extending alongside the path of travel of the truck and pivotally mounted for movement into and from an operative position in which said member may frictionally engage the same, means to move said bar into and from operative position at will, a turntable lock including a latch dog on said truck movable to unlatching position, and means to move said dog during travel of the truck in said one direction comprising a rotary dog operating member settable by movement of said bar into operative position to project the same into the path of travel of said dog for wiping engagement thereby.

WILSON LENNOX.